Oct. 11, 1966     R. GOODMAN     3,277,736
DEVICE FOR TRANSLATING ROTARY MOTION INTO LINEAR MOTION
Filed July 27, 1964
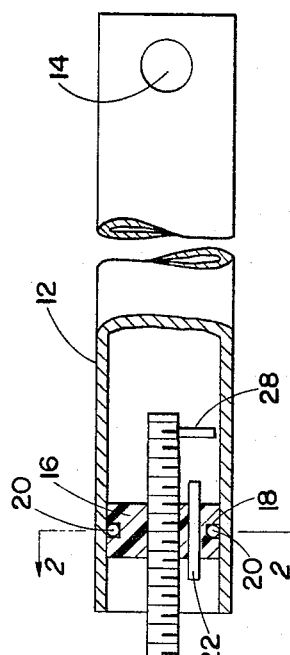
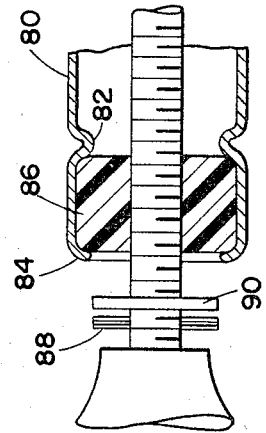
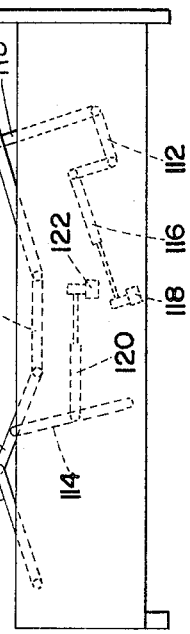
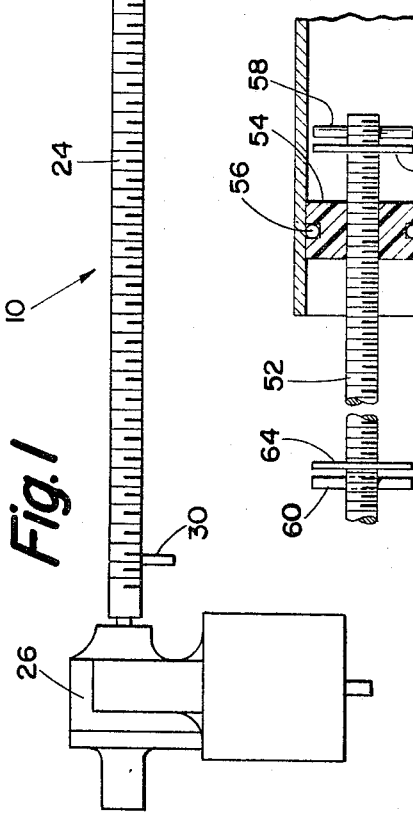
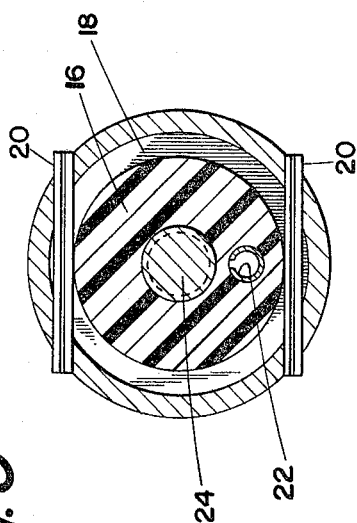
INVENTOR.
ROBERT GOODMAN
BY
*Arthur A. Jacobs*
ATTORNEY

3,277,736
DEVICE FOR TRANSLATING ROTARY MOTION INTO LINEAR MOTION

Robert Goodman, 5325 Westminster Ave., Philadelphia, Pa.
Filed July 27, 1964, Ser. No. 385,435
10 Claims. (Cl. 74—424.8)

This invention relates to a nut and screw assembly for translating rotary motion into linear motion, and it more particularly relates to an assembly of this type wherein the linear motion is automatically halted after a predetermined linear movement has been effected.

The use of a nut and screw assembly for translating rotary to linear motion is not, of course, new. However, until some years ago, it was necessary to utilize clutch mechanisms and the like to prevent jamming of the nut and screw when the linear movement reached a predetermined limit.

The necessity of using clutch mechanisms and similar complicated and expensive mechanisms was then eliminated by the introduction of an overrunning screw and nut assembly wherein the assembly consisted of a screw with a helical ball race and a nut machine, on the inside diameter, with a series of concentric grooves. A ball retainer was interposed between the nut and screw and served to position the balls in spaced relationship consistent with the points where the annular grooves in the nut aligned with the helical grooves on the screw. When transmitting torque, the balls rolled between the screw and the nut because the balls were held captive in the annular grooves of the nut and could not thread out, thereby advancing the nut along the screw while the nut travelled axially along the screw. The retainer rotated in the same manner as the arm of a planetary gear system.

When the retainer lug struck one of the stop pins located on the screw for the purpose of limiting axial travel, the retainer and balls rotated as a unit with the screw. The balls then rolled in the concentric grooves of the nut and slid on the screw without imparting any further axial advance of the nut, thereby providing a "free-wheeling" feature. When the power source reversed screw rotation, the stop pin moved away from the retainer, allowing the balls to again roll in the helical grooves of the screw, thereby advancing the nut in the opposite direction.

Although the above-described type of "free-wheeling" nut and screw assembly proved to be a great improvement over the former use of clutch mechanisms and the like, there were various objectional features inherent in the device, such as the necessity of using balls and matching grooves, both on the nut and on the screw, which had to be highly and expensively machined in order to obtain the close tolerances which were absolutely necessary for effective operation of the device. It also required the use of an additional element, namely the ball retainer, which increased the manufacturing cost, as well as the cost of maintenance and replacement.

Another serious objection was the inherent limitation of the load carrying capacity of the device, since the greatest number of balls that could be used was determined by the number of concentric grooves that could be accurately machined within the nut.

Furthermore, in practice, the thrust angle had to be reduced as much as possible within the physical limits of the component parts in order to increase the load carrying capacity of the balls. In addition, extreme caution had to be taken to prevent the balls from working too close to the crest of the ball races to prevent chipping and fracture.

In general, the helix angle of the screw could not be greater than 9° because, if this angle were exceeded, the balls might slide or slip out of true rolling engagement.

It was also necessary, because of the many highly machined parts and their close tolerances, to keep the device constantly lubricated in order to obtain maximum efficiency and prevent early damage and wearing out of the parts.

It is one object of the present invention to overcome the above and other disadvantages of the aforementioned type of "free-wheeling" nut and screw assemblies by providing a nut and screw assembly which utilizes fewer parts, requires less accurate machining of the parts, and which has a load carrying capacity that is not limited by the number of balls, the number of concentric grooves or the helix angle of the screw.

Another object of the present invention is to provide a nut and screw assembly of the aforementioned type which does not require the constant addition of lubricating oil or the like.

Another object of the present invention is to provide a nut and screw assembly of the aforementioned type which is relatively simple in construction, inexpensive to produce and requires a minimum of maintenance and replacement of parts due to wear.

Other objects and many of the attendant advantages of this invention will be readily appreciated as the same becomes better understood by reference to the following description when read in conjunction with the accompanying drawings wherein:

FIG. 1 is a side view, partly in section and partly in elevation, with parts broken away, of a nut and screw assembly embodying the present invention.

FIG. 2 is a cross-sectional view taken on line 2—2 of FIG. 1.

FIG. 3 is a fragmentary sectional view of second embodiment of the invention.

FIG. 4 is a fragmentary sectional view of a third embodiment of the invention.

FIG. 5 is a somewhat diagrammatic view of an adjustable bed equipped with nut and screw assemblies such as shown in FIGS. 1–4.

Referring now in greater detail to the figures of the drawing wherein similar reference characters refer to similar parts, there is shown an assembly, generally designated 10, which comprises a hollow, tubular shaft 12 having a transverse aperture 14 at one end for holding a rivet, bolt, screw or the like for pivotally connecting the shaft to a member to be actuated.

Closely fitted within the tube 12 is a nut 16, preferably constructed of a self-lubricating plastic such as "Delrin" (an acetal resin produced by Du Pont with a low coefficient of friction).

The nut 16 is of such diameter that it snugly fits within the hollow tube 12 with sufficient frictional engagement to normally prevent rotation of the nut within the tube. This frictional engagement is effected despite the low coefficient of friction of the "Delrin" because of the relatively large surface area around the outer periphery of the nut compared to the fine threads on the interior of the nut which are also made of "Delrin" and therefore also have a low coefficient of friction. However, this frictional engagement may be overcome when a rotational force of sufficient intensity is applied to the nut.

The nut 16 is further provided with an outer peripheral groove 18 and, extending through this groove tangentially to the nut, are one or more (here shown as two) roll pins 20. These roll pins 20 are shown as being oppositely-disposed, and the ends of each extend through corresponding apertures in the tube 12 (as best shown in FIG. 2), whereby they retain the nut against axial movement relative to the tube 12 and also act as supplemental frictional means for preventing rotation of the nut in the tube until overcome by the previously-mentioned rotational force of sufficient intensity. Rigidly secured in the nut 16 and extending axially thereof so that its ends project from opposite radial faces of the nut 16 is a pin 22.

The nut 16 is provided with a threaded central opening through which extends a screw-threaded shaft 24. This shaft 24 may be rotated by any desirable operating means but is herewith shown operatively connected to a reversible electrical motor 26 of standard design. The screw shaft 24 is further provided with a radially extending stop pin adjacent each end, these stop pins being respectively designated 28 and 30.

In operation, as the motor 26 rotates the screw shaft 24 in one direction, since the nut 16 is held in frictional engagement with the inner wall of the tubular shaft 12, the nut and the tubular shaft 24 move, as a unit, axially of the screw shaft 24 to the left (as viewed in FIG. 1) until the corresponding projecting end of the pin 22, as it rotates with the nut 16, rotationally engages the pin 28. The continued rotation of the screw shaft 24 causes the pin 22, in lateral engagement with the pin 28, to exert a rotational force on the nut 16, through the pin 28, sufficient to overcome the frictional retaining force of the mating nut and tube peripheries and of the roll pins 20. The nut then rotates with the shaft 24 relative to the hollow shaft 12, thereby halting any further axial movement of the nut 16 and shaft 12 relative to the screw shaft 24. In effect, therefore, the shaft 24 is operatively de-clutched from the shaft 12.

When the motor 26 is operated in the reverse direction, the pin 22 is rotated in the opposite direction and becomes disengaged from the pin 28. The nut 16 is then again frictionally held against axial movement relative to the tubular shaft 12, the nut 16 and shaft 12 being then moved axially to the right (as viewed in FIG. 1). This movement to the right may continue until the left end of pin 22 rotationally engages pin 30, at which time the reverse rotation of the nut 16 relative to shaft 12 takes place and the shaft 12 is again operatively de-clutched from shaft 24.

In FIG. 3 there is shown a modified form of the mechanism wherein the tubular shaft 50 correseponds to the tubular shaft 12 and the threaded shaft 52 corresponds to the threaded shaft 24. The nut 54 and roll pins 56 also correspond to the respective members 16 and 20, while the stop pins 58 and 60 correspond to the pins 28 and 30 although extending radially in two directions from the screw shaft. However, the nut 54 is not provided with any axial pin, such as pin 22, whereas the screw shaft 52 is provided with a loose washer adjacent each end, these washers being designated as 62 and 64 respectively.

In the operation of the mechanism of FIG. 3, when the nut 54 and tubular shaft 50 move to the right sufficiently, the pin 58 and washer 62 engage the corresponding radial face of the nut 54, thereby preventing any further axial movement of the nut. Continued rotation of the screw shaft, since it cannot overcome the stopping force of the pin 58, overcomes the frictional holding force on the periphery of the nut, and the nut then rotates together with the screw shaft. The washer 62 here acts as a buffer to prevent injury to the nut by the pin 58. When the screw shaft 52 is rotated in the opposite direction it sufficiently releases the pin 58 to permit the nut to be peripherally held again, whereby the nut and tubular shaft 50 move to the left until the nut is abutted by the pin 60 and washer 64, at which time the reverse rotation of the nut and screw shaft takes place.

A further modification of the invention is illustrated in FIG. 4. This assembly is identical to that shown in FIG. 3 except that the tubular shaft 80, corresponding to the tubular shaft 50, is provided with an internal peripheral rib 82 which acts in conjunction with a peripheral flange 84 on the open end of the tube 80 to hold the nut 86, corresponding to nut 58, against axial movement relative to the tubular shaft 80. The rib and flange also provide frictional engagement for the nut. They, therefore, serve the same general functions as the roll pins 20 of FIG. 1 and 56 of FIG. 3.

The mechanism of FIG. 4 is illustrated as being provided with stop pins 88 and washers 90 similar to those shown at 58, 60 and 62, 64 in FIG. 3. However, if desired, these may be replaced by an axial pin such as pin 22 and radial pins such as pins 28 and 30 in FIG. 1, in which event, the mechanism would operate in the same manner as that of FIG. 1 instead of in the manner of that of FIG. 3. It is also possible to substitute one or a series of separate annularly-spaced indentations for the completely annular rib 82 or flange 84.

The above-described mechanism obviously possesses a great many uses in mechanical systems. One such use is illustrated in FIG. 5 where an adjustable bed framework, generally designated 100, includes linkage 102 forming the head, linkage 104 forming the foot, and intermediate linkage 106 and 108. The linkage 102 is operated through a lifting lever 110 actuated by a bell crank 112, while the linkage 108 is operated by a lifting link 114. The bell crank 112 is actuated by a nut and screw assembly 116 connected to an electrical motor 118, while the lifting link 114 is directly actuated by a nut and screw assembly 120 connected to an electrical motor 122.

The entire construction and operation of the bed of FIG. 5, except for the nut and screw assemblies 116 and 120, is conventional, and it is not considered necessary to go into any further details relative thereto, except to observe that the linkage operates in a manner such as that shown, for example, in U.S. Patent No. 1,908,530.

Although the screw shaft has been illustrated above as being axially fixed while the nut and tubular shaft move axially thereof, it is within the scope of the invention to make the nut and tubular shaft axially fixed while moving the screw shaft axially.

Obviously, many modifications of the present invention are possible in the light of the above teachings. It is, therefore, to be understood that within the scope of the appended claims, the invention may be practiced otherwise than as specifically described.

The invention claimed is:

1. A mechanical movement device comprising a first shaft and a second shaft, said shafts being operatively connected for axial movement relative to each other, the first shaft being screw-threaded and the second shaft being held against rotation and having a nut threadedly engaged with said first shaft, said nut being axially fixed relative to said second shaft, restraining means normally holding said nut rotationally fixed relative to said second shaft whereby relative rotation between said first shaft and said nut provides relative axial movement between said first and second shafts, and restraint overcoming means on said first shaft for overcoming said restraining means upon predetermined axial movement of said shafts relative to each other, the overcoming of said restraining means causing said nut to rotate with said first shaft relative to said second shaft to discontinue relative axial movement of said shafts.

2. The device of claim 1 wherein said restraint overcoming means on said first shaft is a radial projection laterally engageable with an axial projection on said nut to rotate said nut in conjunction with rotation of said first shaft.

3. The device of claim 1 wherein said restraint overcoming means on said first shaft is a radial projection constructed to abut the corresponding radial face of the nut upon said predetermined axial movement of said shafts to prevent further axial movement of said nut in one direction.

4. A mechanical movement device comprising a first shaft and a second shaft, said shafts being operatively connected for axial movement relative to each other, the first shaft being screw-threaded and the second shaft being held against rotation and having a nut threadedly engaged with said first shaft, said nut being axially fixed relative to said second shaft, restraining means normally holding said nut rotationally fixed relative to said second shaft whereby relative rotation between said first shaft and said nut provides relative axial movement between said first and second shafts, and restraint overcoming means on said first shaft for releasing said restraining means upon predetermined axial movement of said shafts relative to each other, overcoming of said restraining means causing said nut to rotate with said first shaft relative to said second shaft to discontinue relative axial movement of said shafts, said second shaft being hollow and said nut being positioned therein with its outer periphery in close fit with the inner periphery of the hollow shaft, said close fit providing frictional engagement, said frictional engagement comprising said restraining means, and said restraint overcoming means comprising stop means on said first shaft, said stop means being engageable with contact means on said nut for overcoming said frictional engagement.

5. The device of claim 4 wherein said contact means is an axially projecting pin fixed to said nut and rotatably engaged by said stop means during rotation of said first shaft.

6. The device of claim 4 wherein said contact means is a radial face of said nut against which said stop means exerts an axial restraining force.

7. The device of claim 4 wherein said nut is axially fixed relative to said second shaft by at least one pin, said nut having an outer peripheral groove, the opposite ends of said pin extending through corresponding apertures in said second shaft, and an intermediate portion of said pin being positioned in said groove in tangentially frictional engagement with said nut.

8. The device of claim 4 wherein said nut is axially fixed relative to said second shaft by at laest one pin, said hollow shaft on one side of said nut and a flange on said hollow shaft on the opposite side of said nut.

9. The device of claim 4 wherein said nut is constructed of a polymeric material having a low coefficient of friction.

10. In a foldable bed having a frame having a plurality of sections hinged to each other, and having a linkage operatively connected to at least one of said sections for moving said section relative to other sections, a nut and screw device operatively connected to and for operation of said linkage, said nut and screw device comprising: a first shaft and a second shaft, said shafts being operatively connected for axial movement relative to each other, the first shaft being screw-threaded and the second shaft being held against rotation and having a nut threadedly engaged with said first shaft, said nut being axially fixed relative to said second shaft, restraining means normally holding said nut rotationally fixed relative to said second shaft whereby relative rotation between said first shaft and said nut provides relative axial movement between said first and second shafts, and restraint overcoming means on said first shaft for overcoming said restraining means upon predetermined axial movement of said shafts relative to each other, overcoming of said restraining means causing said nut to rotate with said first shaft relative to said second shaft to discontinue relative axial movement of said shafts.

No references cited.

DAVID J. WILLIAMOWSKY, *Primary Examiner.*

L. H. GERIN, *Assistant Examiner.*